(12) United States Patent
Dice et al.

(10) Patent No.: US 6,530,017 B1
(45) Date of Patent: Mar. 4, 2003

(54) SYSTEM AND METHOD PROVIDING AN ARRANGEMENT FOR EFFICIENTLY EMULATING AN OPERATING SYSTEM CALL

(75) Inventors: David Dice, Foxboro, MA (US); Sunil Sreenivasan, Mt. Kisco, NY (US); David Aha, Norfolk, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/062,908

(22) Filed: Apr. 20, 1998

(51) Int. Cl.[7] .............................................. G06F 15/00

(52) U.S. Cl. ...................................... 712/242

(58) Field of Search ................................ 709/319, 328, 709/102, 310; 703/26, 23; 712/242, 228, 227; 711/203, 206

(56) References Cited

U.S. PATENT DOCUMENTS 5,765,206 A * 6/1998 Hohensee et al. .......... 711/203
6,086,623 A * 7/2000 Broome et al. ............... 703/26

* cited by examiner

*Primary Examiner*—Sue Lao
(74) *Attorney, Agent, or Firm*—Chapin & Huang, L.L.C.; Barry W. Chapin, Esq.

(57) ABSTRACT

An operating system call control subsystem is disclosed for use in a computer that includes a processor for processing a program, the program instructions of an operating system call instruction type identifying one of a plurality of types of operating system calls, each type of operating system call being associable with an operating system call type identifier value within a predetermined range of values. The operating system call control subsystem comprises a crossover table, an operating system call instruction type address resolution module, and an operating system call instruction type processing module. The crossover table has a number of entries corresponding to a predetermined fraction of the predetermined range, each entry in the crossover table having an instruction for enabling the processor to save a value corresponding to an offset of the entry into the crossover table. The operating system call instruction type address resolution module provides the instructions of the operating system call instruction type with respective target addresses that include an operating system call set identifier in a set of operating system call set identifiers, the number of operating system call set identifiers multiplied by the number of crossover table entries corresponding to the predetermined range and an offset value corresponding to an offset to an entry into the crossover table. The operating system call instruction type processing module, in response to the processor processing an instruction of the operating system call instruction type, (a) saves the operating system call set identifier from the target address, (b) selects one of the entries in the crossover table using the offset value of the target address, (c) processes the instruction from the selected entry of the crossover table to save the value corresponding to the offset of the selected entry in the crossover table, and (d) generates the operating system call type identifier value in connection with the saved operating system call set identifier and the saved value corresponding to the offset of the selected entry in the crossover table.

18 Claims, 5 Drawing Sheets

SYSTEM AND METHOD PROVIDING AN ARRANGEMENT FOR EFFICIENTLY EMULATING AN OPERATING SYSTEM CALL

FIELD OF THE INVENTION

The invention relates generally to the field of digital computers, and more particularly to an arrangement for facilitating an efficient emulation of an operating system call structure provided by a microprocessor of one architecture, during emulation of programs written for that microprocessor by a microprocessor of another architecture.

BACKGROUND OF THE INVENTION

Digital computers process a variety of diverse types of programs, with each program including a series of instructions that enable the computer to perform specific operations in connection with specific elements of data. A variety of types of processors are available for use in digital computer systems, with each type of processor being constructed in accordance with an architecture which describes, inter alia, the set of instructions that a processor constructed in accordance with the architecture is expected to execute, the format(s) of the various instructions, the types and formats of data which may be processed, definitions for various registers that may be used during instruction processing, how information in the computer's memory will be accessed and how a processor constructed in accordance with the architecture is to handle exception conditions which may be detected during instruction processing.

It is often desirable to enable one type of processor, as an "emulated processor," to be emulated by another type of processor, as a "host processor." A host processor generally emulates an emulated processor by processing programs which have been written for the emulated processor, to generate an output that effectively corresponds to the output that would be generated by the emulated processor. Generally, emulation is accomplished by translating a program generated for execution by an emulated processor (an "original" program) into a program which may be processed by a host processor (a "translated" program). This translation process may include, for example, generating from instructions and other elements of the original program, instructions and other elements which are based on the host processor's architecture thereby to provide the translated program. The translation may be performed by, for example, the host processor itself, by another processor in the same computer system or by another computer system and made available to the host processor which is to process the program, under control of a translation program. In performing the translation, each instruction or sequences or various groups of instructions in the original program (that is, the program based on the emulated processor's architecture) may be translated into one or a series or group of instructions for processing by the host processor. The translation process is typically performed for all or selected portions of an original program when the processor begins processing the original program, although it will be appreciated that an instruction or group of instructions of the original program may be translated as the processing proceeds. In addition, if the emulated processor's data formats are not directly useable by the host processor, the data may be processed to convert it from the emulated processor's formats to formats usable by the host processor.

Typically, programs are constructed to be processed under control of a particular operating system, such as Unix or Microsoft Windows™ or one of many other operating systems that are available. Operating systems are programs that provide a number of low-level services, such as interacting with the computer's hardware to retrieve data for processing by the program, receiving operator input through an operator input device such as a keyboard or mouse, controlling graphical display of output data on a video display device, and many other services. An operating system performs services for a program in response to "calls" made thereto by the program. Since an operating system is also a program, during emulation of a program by a host processor, it is possible to also emulate the operating system. However, if the operating system normally used with the host processor provides services that are similar to those provided by the operating system for the program being emulated, it may be more efficient to have the host processor's operating system provide those services. A problem arises, however, if calls to the host processor's operating system are made in significantly a different manner than in the operating system used with the emulated program.

SUMMARY OF THE INVENTION

The invention provides a new and improved arrangement and method for facilitating an efficient emulation of an operating system call structure provided by a microprocessor of one architecture, during emulation of programs written for that microprocessor by a microprocessor of another architecture.

Figure 1:
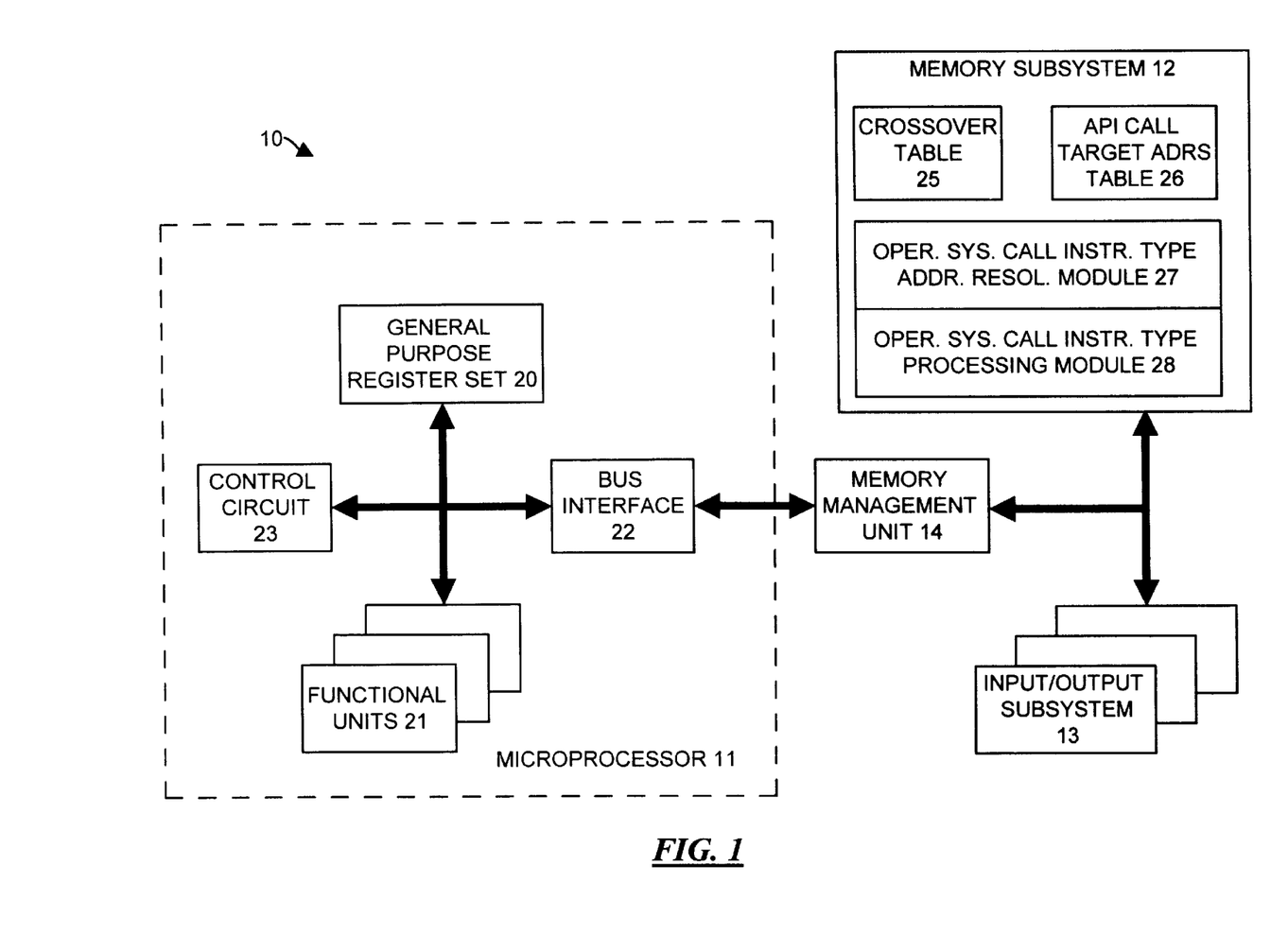
FIG. 1 is a functional block diagram of a digital computer including a microprocessor (termed a host microprocessor) and further including an arrangement for facilitating an efficient emulation of an operating system call structure provided by a microprocessor of another architecture (termed an emulated microprocessor), during emulation of programs written for the emulated microprocessor by the host microprocessor, in accordance with the invention.
Figure 6:
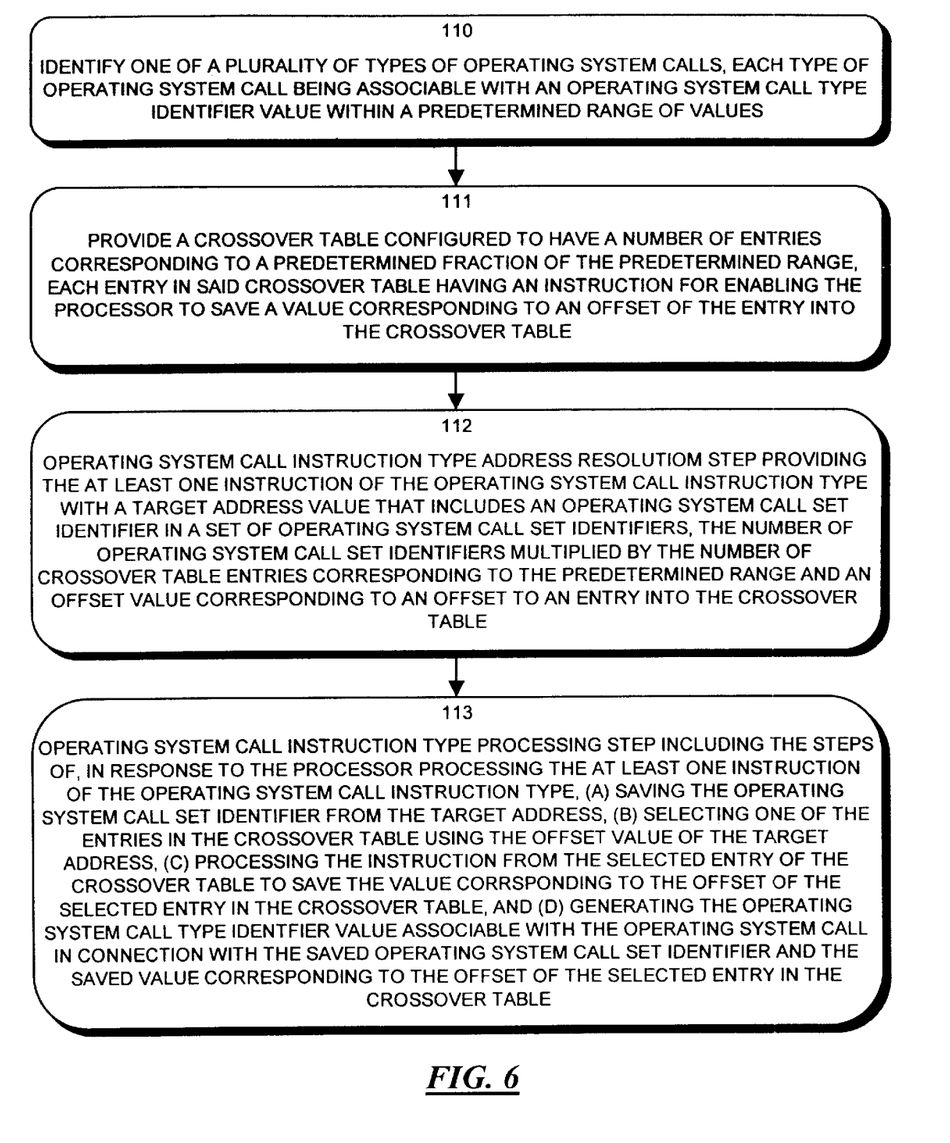
FIG. 6 is a flowchart of processing performed by an operating system call control subsystem in accordance with the invention.

In brief summary, the invention provides operating system call control subsystem for use in a computer that includes a processor for processing a program, the program including instructions of an operating system call instruction type identifying one of a plurality of types of operating system calls, each type of operating system call being associable with an operating system call type identifier value within a predetermined range of values (step 110 in FIG. 6). The operating system call control subsystem comprises a crossover table, an operating system call instruction type address resolution module 27 (FIG. 1), and an operating system call instruction type processing module 28 (FIG. 1). The crossover table has a number of entries corresponding to a predetermined fraction of the predetermined range, each entry in the crossover table having an instruction for enabling the processor to save a value corresponding to an offset of the entry into the crossover table (step 111 in FIG. 6). The operating system call instruction type address resolution module provides the instructions of the operating system call instruction type with respective target addresses that include an operating system call set identifier in a set of operating system call set identifiers, the number of operating system call set identifiers multiplied by the number of crossover table entries corresponding to the predetermined range and an offset value corresponding to an offset to an entry into the crossover table (step 112 in FIG. 6). The operating system call instruction type processing module, in response to the processor processing an instruction of the operating system call instruction type, (a) saves the operating system call set identifier from the target address, (b) selects one of the entries in the crossover table using the offset value of the target address, (c) processes the instruction from the selected entry of the crossover table to save the value corresponding to the offset of the selected entry in the crossover table, and (d) generates the operating system call type identifier value in connection with the saved operating system call set identifier and the saved value corresponding to the offset of the selected entry into the crossover table (step 113 in FIG. 6). Since the operating system call type identifier value is generated in relation to the particular one of the operating system call set identifier as well as the offset of the selected entry into the crossover table, the crossover table can be construct to have a relatively small fraction of the number of entries which might otherwise be required if one entry were provided for each possible value in the predetermined range.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

FIG. 1 is a functional block diagram of a digital computer 10 constructed in accordance with the invention. With reference to FIG. 1, the computer 10 includes a microprocessor 11 which communicates with a memory subsystem 12 and one or more input/output subsystems generally identified by reference numeral 13 through a memory management unit 14. The memory subsystem 12 includes a number of physical addressable storage locations in which data and instructions (which will be referred to collectively herein as "information") to be processed by the microprocessor 11 may be stored. In addition, the microprocessor 11, after processing data, may transfer the processed data to the memory subsystem 12 for storage.

The computer 10 may include a number of diverse types of input/output subsystems 13, including mass storage subsystems, operator input and output subsystems, network ports and the like. The mass storage subsystems generally provide long-term storage for information which may be processed by the microprocessor 11. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the microprocessor 11, information stored in the mass storage subsystems may be transferred to the memory subsystem 12 for storage. After the information is stored in the memory subsystem 12, the microprocessor 11 may retrieve it from the memory subsystem 12 for processing. After the processed data is generated, the microprocessor 11 may also enable the mass storage subsystems to retrieve the processed data from the memory subsystem 12 for relatively long-term storage.

The operator input and output subsystems generally provide an operator interface to the digital computer system 10. In particular, the operator input subsystems may include, for example, keyboard and mouse devices, which an operator may use to interactively input information to the digital computer system 10 for processing. In addition, the operator input subsystems may provide mechanisms whereby the operator may control the digital computer system 10. The operator output subsystems may also include devices such as video display devices, through which the digital computer system 10, under control of the microprocessor 11, displays results of processing to the operator. In addition, a printer may be provided to provide a hardcopy output for the operator.

The network ports may enable the digital computer system 10 to connect to a communication link, thereby connecting the computer system 10 in a computer network. The network ports enable the computer system 10 to transmit information (including both program instructions and data) to, and receive information from, other computer systems and other devices in the network (not shown). In a typical network organized according to, for example, the client-server paradigm, certain computer systems in the network are designated as servers, which store information for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As is conventional, each of the input/output subsystems 13 will typically include registers and other data storage elements (not shown) which store control, status and other information which are used to control the operations performed by the respective input/output subsystem 13 and to indicate its operational status. The microprocessor 11 may store information in the registers and other data storage elements, thereby to control the respective input/output subsystem 13, in a manner similar to the manner in which it stores information in the memory subsystem 12. Similarly, the microprocessor 11 may retrieve the information contained in the input/output subsystem 13, in a manner similar to the manner in which it retrieves information in the memory subsystem 12, to ascertain the operational status of the respective input/output subsystem 13.

The memory management unit 14 performs a number of operations. In particular, the memory management unit 14 typically includes a cache memory, which caches information requested by the microprocessor 11 from the memory subsystem 12. In addition, as is typical, when the microprocessor 11 requests information to be retrieved from, for example, the memory subsystem 12, or provides processed data for storage in, for example, the memory subsystem 12, the microprocessor 11 will provide an address in a virtual address space to the memory management unit 14. The various application programs processed by the microprocessor 11 may be provided with respective virtual address spaces. The virtual address space is divided into "pages," each of which comprises a selected number of virtual addressable storage locations, with each virtual addressable storage location storing information. The pages of an application program's virtual address space are normally stored on a mass storage subsystem, and the microprocessor 11 enables individual ones of the pages to be copied to the memory subsystem 12 as they are needed during processing, and for those pages that are modified during processing the microprocessor 11 may enable them to be copied to the mass storage subsystem for long-term storage.

Respective pages of a virtual address space may be compactly stored in physical locations in the memory subsystem 12, which are identified by physical addresses, and in performing an access operation in connection with a particular virtual address space location (that is, a retrieval of information from or a storage of information in a particular physical location) in response to a request from the microprocessor 11, the memory management unit 14 will perform a translation of the virtual address to obtain the physical address for use in performing the access operation in connection with the memory subsystem 12. In addition, the memory management unit 14 may perform several checking operations, including checking to determine whether or not the page is in the memory subsystem 12, whether or not the application program has permission to access (that is, read data from or write data into) the page, and whether or not the requested page is a valid page in the virtual address space, and the like. If the memory management unit 14 makes a negative determination in the checking operation, that is, if it determines, for example, that the page is not in the memory subsystem 12, that the application program does not have the appropriate access permission, or if it determines that the requested page of the virtual address space page is not a valid page in the application program's virtual address space, it may generate an access fault indication, which the microprocessor 11 may receive and use in performing selected fault handling operations.

In one embodiment, a microprocessor 11 useful in system 10 comprises a microprocessor constructed in accordance with the SPARC Version 9 architecture described in the SPARC International, Inc [David L. Weaver and Tom Germond (eds)], *The SPARC Architecture Manual Version 9* (Prentice-Hall, 1994) (hereinafter referred to as "the SPARC Architecture Manual, Version 9"). The microprocessor 11 generally includes a number of elements, including a register set 20, one or more functional units 21, a bus interface 22 and a control circuit 23. The control circuit 23 controls the processing operations as performed by the microprocessor 11 under control of instructions provided by a program. Generally, under control of the control circuit 23, the bus interface 22, cooperating with the memory management unit 14, retrieves instructions and data from the memory subsystem 12 or data storage elements maintained by particular input/output subsystems 13 for processing and loads the retrieved data into registers in the register set 20. Also under control of the control circuit 23, the functional units 21 perform logical, integer and floating point arithmetic, and other processing operations in connection with data which the control circuit 23 enables to be transferred thereto from the register set 20, to generate processed data which will be transferred to the register set 20 for storage. The control circuit 23 may also enable the bus interface 22, also cooperating with the memory management unit 14, to transfer processed data from the register set 20 to the memory subsystem 12 or data storage elements maintained by particular input/output subsystems 13 for storage.

The invention provides an arrangement for enabling the operating system that is used to control host microprocessor 11, as a host microprocessor, to efficiently provide operating system services to programs written to be processed by a microprocessor of another architecture, in one embodiment a microprocessor comprising Intel Corporation's x86 family of microprocessors (which currently include Intel's 8086, 8088, 80286, 80386, 80486 and "Pentium" lines of microprocessors), as an emulated microprocessor, during emulation of those programs by the host microprocessor 11. The arrangement facilitates the efficient provision of such operating system services without the necessity of emulating the operating system, such as the Microsoft Windows™ operating system, which would typically be used if the programs were being processed by a microprocessor of the x86 microprocessor family. In one embodiment, in which the host microprocessor 11 comprises a microprocessor constructed in accordance with the aforementioned SPARC Architecture Manual, Version 9, the operating system used with the host microprocessor 11, which is termed a "host operating system," is generally a thirty-two-bit Unix operating system providing a thirty-two bit operating system call structure. On the other hand, the Microsoft Windows™ operating system, particularly the Microsoft Windows™ Version 3.1 and earlier operating systems, which is used with the emulated programs when they are processed by a microprocessor in the x86 family of microprocessors, is generally a sixteen-bit operating system, and provides a sixteen-bit call structure.

The invention more specifically provides an arrangement whereby the sixteen-bit operating system call structure used in the Microsoft Windows™ operating system can be efficiently emulated by host microprocessor 11. In the Microsoft Windows™ sixteen-bit call structure, each type of operating system call, such as a call to provide a window for a program on the computer's video display device, is identified by a predetermined encoding of a sixteen-bit operating system call index value. This allows for as many as 64 k (k=1024) types of operating system calls. Each type operating system call, in turn, is associated with an entry point to a routine to handle the operating system call. The Microsoft Windows™ operating system need not provide as many as 64 k types of operating system calls, and thus need not actually provide for 64 k entry points, but to facilitate emulation the host microprocessor 11 and its host operating system preferably will provide for the possibility of an operating system call for each of the possible 64 k encodings of the sixteen-bit operating system call index value.

Generally, calls used by programs to the Microsoft Windows™ operating system in connection with a microprocessor in the x86 family of microprocessors, are in the form of "far calls." Before proceeding further, it would be helpful to generally describe how a program addresses storage locations in connection with a microprocessor in the x86 family of microprocessors, after which a far call will be described. Generally, a microprocessor in the x86 microprocessor family provides to a program a segmented address space comprising a plurality of segments. A program, to access a storage location in the computer including the x86 microprocessor, provides a virtual address in the segmented address space. The x86 microprocessor, after receiving the address in the segmented address space, generates a virtual address in a linear, or non-segmented, virtual address space, which then is translated into a physical address that identifies the specific storage location to be accessed.

Figure 2:
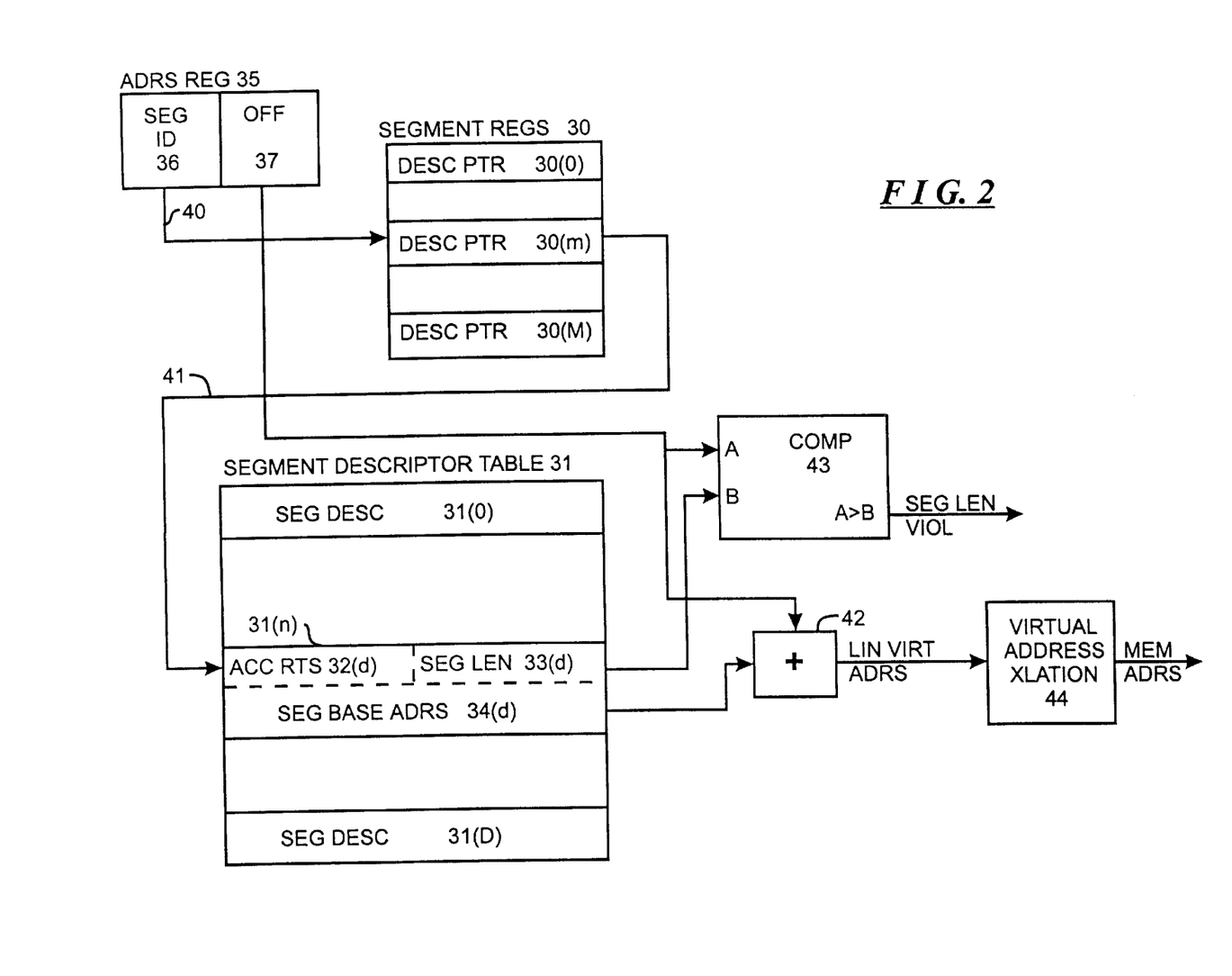
FIG. 2 is a diagram that is useful in understanding address translation operations performed by microprocessors of a selected architecture (namely, Intel's x86 family of microprocessors), which is useful in understanding the invention.

FIG. 2 depicts a functional block diagram of an arrangement for performing these address translation operations. With reference to FIG. 2, a segmented virtual address space provided by a microprocessor of the x86 microprocessor family is formed from a number of segments, including one or more code, data, stack and extra segments. A segmented virtual address space may actually consist of a number of code, data and extra segments, but only one code segment, one data segment and one stack segment may be used at any point in time, although several extra segments may be used at any point in time. Each of the code, data and stack segments is associated with one segment register 30(m) in a segment register set 30. A predetermined number (in one embodiment, three) of segment registers 30(m) are provided in the segment register set 30 for the extra segments, allowing that predetermined number of extra segments to be used at any point in time. Generally, the code segment is typically be used for storing program instruction code, the data segment is typically used for storing program data, and the stack segment is typically used for storing stack(s) used by the program. The application program may use the extra segments for a variety of purposes, such as storing arrays or temporary data structures. Each segment register 30(m) will contain a descriptor pointer for the particular segment, and so segment register 30(0) may contain a descriptor pointer for the code segment, segment register 30(1) may contain a descriptor pointer for the data segment, segment register 30(2) may contain a descriptor pointer for the stack segment, and other segment registers 30(3) through 30(M) will contain descriptor pointers for other segments.

Each segment register 30(m) contains a descriptor pointer that identifies one of a plurality of segment descriptors 31(0) through 31(D) (generally identified by reference numeral 31(d)) in a segment descriptor table 31. Each segment descriptor, in turn, is associated with and identifies one of the segments in the segmented virtual address space provided for the program. Each segment descriptor 31(d) in the segment descriptor table 31 generally includes three fields, including an access rights field 32(d), a segment length field 33(d) and a segment base address field 34(d). The access rights field 32(d) contains access rights information, whose use will be described below. The segment base address field 34(d) contains a segment base virtual address and the segment length field 33(d) contains a segment length value, both of which serve to define a particular segment in the segmented virtual address space. The descriptors 31(d) in the respective segment descriptor tables 31 are preferably maintained by the operating system, and the particular descriptor pointer value which is maintained in each of the segment registers 30(m) is also preferably controlled by the operating system.

When a program initiates a memory access operation, it will provide a segmented virtual address, which has a structure depicted in FIG. 2, in the segmented virtual address space. The functional elements depicted on FIG. 2 will convert the segmented virtual address first to a linear virtual address, and, from the linear virtual address, to a physical address which identifies a particular physical storage location to be accessed. As shown in FIG. 2, the address in the segmented virtual address space (illustratively shown in an address register 35) includes a segment identifier field 36 and an offset field 37. The segment identifier field 36 identifies a particular one of the segment in which a storage location is to be accessed, the offset field 37 contains an offset value into the segment. More specifically, the segment identifier in field 36 is used to select a particular segment register 30(m) (as represented by arrow 40), whose contents are used as a descriptor pointer to, in turn, select the particular segment descriptor 31(d) (as represented by arrow 41) to be used in generating the segmented virtual address. The base address from the segment base address field 34(d) of the selected descriptor 31(d) is coupled to an adder 42 and the segment length value from the segment length field 33(d) is coupled to one input of a comparator 43.

The addresses offset field 37 contains an offset from the segment's base into the segment to be used in the memory access operation, and so it (the offset field 37), along with the segment base address value from segment base address field 34(d), are coupled to respective inputs of adder 42. The adder 42 generates a value corresponding to the sum of the offset and the segment base address value, which corresponds to the linear virtual address LIN_VIRT_ADRS which identifies the location in the linear virtual address space represented by the address in register 35. The linear virtual address is then coupled to a virtual address translator 44, which translates the linear virtual address to a physical address in a conventional manner.

To verify that the segmented virtual address in register 35 does not represent an address that is beyond the end of the segment, as defined by the segment length value in field 33(d) of the segment descriptor 31(d), it (the segment length value from field 33(d)) and the offset field 37 are coupled to respective inputs of the comparator 43. The comparator 43, in turn, compares the offset value from the offset field 37 to the segment length value from segment length field 33(d). If the comparator 43 determines that the offset value from the offset field 37 is less than or equal to the segment length value from segment length field 33(d), the segmented virtual address in address register 35 represents a location in the segmented virtual address space that is within the segment defined by the selected segment descriptor 31(d). On the other hand, if the comparator 43 determines that the offset value from the offset field 37 is greater than the segment length value from segment length field 33(d), the segmented virtual address in address register 35 represents a location that is beyond the end of the segment defined by the selected descriptor 31(d); in that case, the comparator 43 generates a SEG LEN VIOL segment length violation indication, which may result in, for example, a segment length violation exception and a trap to the operating system for processing.

As described above, each segment descriptor 31(d) also includes an access rights field 32(d). The access rights field 32(d) generally contains access rights information which is useful in controlling memory accesses. If the access operation initiated by the application program is within the access rights indicated by the access rights field 32(d), the access operation can proceed. On the other hand, if the access operation is not within the access rights indicated by the access rights field 32(d), the access operation will not proceed, which may result in an access rights violation exception and a trap to the operating system for processing. In the x86 architecture, access rights may be used to control whether a particular segment can be accessed by an application program or only by the operating system, and whether or not an application program can store information in storage locations in particular segments, which may facilitate read-only access to a file or fields of a file by a particular application program. In addition, the access rights can be used to indicate that particular segments are "execute only," which may indicate that such segments contain program code which an application program may only enable to be retrieved and executed.

As noted above, an operating system call in Microsoft Windows™ is in the form of a far call. The x86 architecture provides for two types of calls, namely, near calls and far calls. Each type of call effectively causes a jump or discontinuity in the program's instruction stream, effectively jumping from a current location in the code segment, which contains the program instruction that initiates the call, to another location in either the same segment or a different segment. For near call, the jump is to a target location within the same code segment as the code segment that contains the program instruction that initiates the near call. For a near call, only the offset value in the offset field 37 of address register 35 need be changed. In contrast, a far call is a jump to a target location in another segment. This will require a change in the segment descriptor 31(d) that is used in constructing the linear virtual address, and so the descriptor pointer stored in the segment register 30(m) associated with, in this example, the code segment, will also need to be changed to point to the new segment descriptor 31(d). In addition, the offset value in field 37 will also be changed as necessary to provide the offset of the target location in the segment pointed to by the new segment descriptor 31(d). Following both a near call and a far call, execution of the program will continue with instructions starting from the target location in the respective code segment. Since calls used by programs processed by a microprocessor of the x86 microprocessor family to the Microsoft Windows™ operating system are in the form of far calls, in response to an operating system call the segment register 30(m) associated with the code segment is loaded with a descriptor pointer to a particular segment descriptor 31(d) in the segment descriptor table 31 and an offset value is loaded in the offset field 37 of address register 35.

As noted above, the invention provides an arrangement whereby the sixteen-bit operating system call structure used in the Microsoft Windows™ operating system can be efficiently emulated by host microprocessor 11, using its host operating system, to provide operating system services to emulated programs written for execution by a microprocessor of the x86 microprocessor family. It should be noted preliminarily that, in emulating such a program, the host microprocessor 11 will also emulate the segmented virtual address translation arrangement described above in connection with FIG. 2, to translate addresses provided by the emulated program into at least linear virtual addresses for use in access operations. An arrangement for efficiently performing such translation operations is described in U. S. patent application Ser. No. 08/608,571, filed Feb. 28, 1996 in the names of Paul H. Hohensee, et al., and entitled "System And Method For Emulating A Segmented Virtual Address Space By A Microprocessor That Provides A Non-Segmented Virtual Address Space," assigned to the assignee of the present invention and incorporated herein by reference.

In accordance with the invention, a crossover table 25 (FIG. 1) is provided to enable the host microprocessor 11 to, in response to an operating system call from an emulated program, efficiently transfer control to the routine of the operating system controlling the host microprocessor 11 that will be used to service the operating system call. The crossover table 25 includes a plurality of entries, generally identified by reference numeral 25(c) (FIG. 3), which provide operating system entry point information which is used by the host operating system in servicing the operating system call from the emulated program. Instead of providing one entry 25(c) for each of the N=64 k operating system entry points, which would require 64 k entries, the crossover table 25 comprises 4096 entries 25(0) through 25(4095) (generally identified by reference numeral 25(c)). Each entry 25(c) includes two elements, namely, a "push (c)" instruction and a "jmp APIDispatch" instruction, and may also include padding to provide at least a predetermined number of bytes in the entry 25(c). In one embodiment, to provide for efficient retrieval of entries 25(c) by the host microprocessor 11 from memory subsystem 12, the entries 25(c) are aligned on sixteen-byte boundaries in the address space provided by host microprocessor 11, and each entry 25(c) is sixteen bytes in length, and so padding may be provided to ensure that each entry 25(c) is sixteen bytes in length. The "push (c)" instruction enables the host microprocessor 11 to push a value "c" on the stack currently used by the host microprocessor 11 for processing of the emulated program. The "jmp APIDispatch" instruction enables the host microprocessor 11 to jump to a routine "APIDispatch" that enables the host microprocessor 11 to perform several operations, including changing stacks and calling the appropriate routine of the host operating system to service the operating system call.

Figure 3:
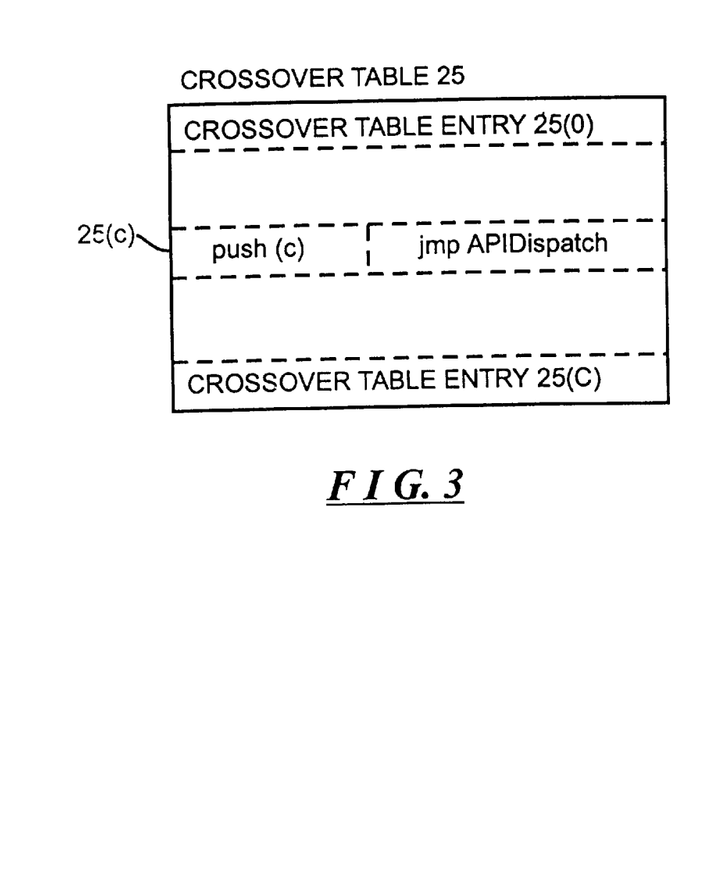
FIGS. 3 and 4 depict data structures used in by the host microprocessor in connection with the operating system call structure emulation arrangement.

The APIDispatch routine uses the value "c" that was previously pushed on the stack, along with other information, to identify the particular operating system call index value, thereby to identify the particular type of operating system call that was made by the emulated program. This, in turn, allows the host operating system to determine the particular one of its operating system routines that is to be used in servicing the operating system call. As noted above, there are as many as 64 k possible entry points, whereas only 4096 possible values of "c" that may be pushed on the stack in response to the "push (c)" instruction in the entries 25(c) of the crossover table 25. However, as also noted above, since the operating system call is a far call, the value of the code segment's descriptor pointer in the code segment's segment register 30(m) is also modified. The value of the code segment descriptor pointer that is loaded into the code segment's segment register 30(m) in response to the operating system call is selected so as to provide the additional information sufficient to identify the appropriate one of the 64 k entry points for the operating system routine to service the operating system call. Thus, the host microprocessor 11, during execution of the APIDispatch routine, uses the value of the code segment pointer and the value pushed on the stack in response to the "push (c)" instruction.

Figure 4:
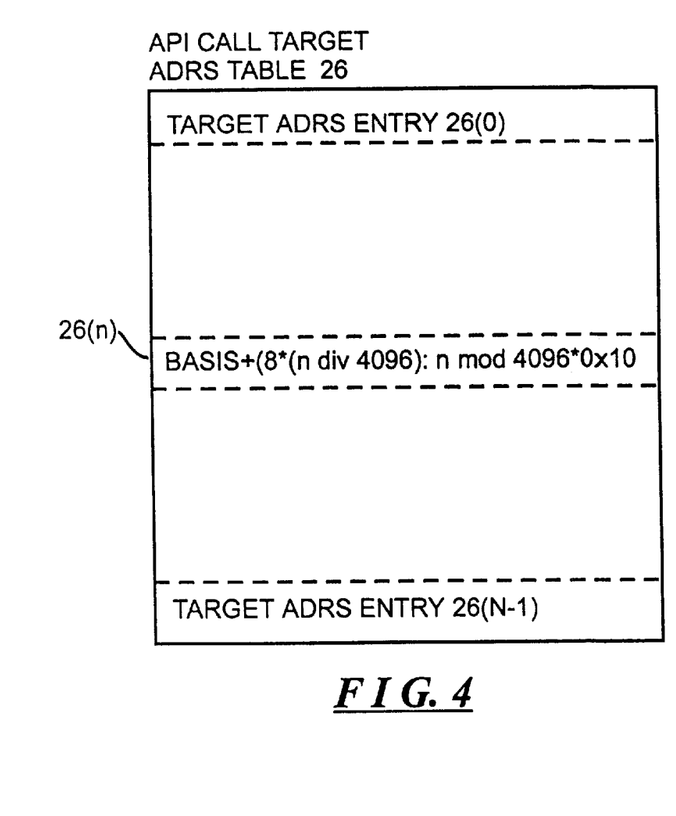

In further accordance with the invention, each of the 64 k operating system call entry points in the sixteen-bit operating system call structure provided by Microsoft Windows™ operating system is associated with specific far call target address that is constructed as will be described in connection with FIG. 4. In one embodiment, the target address provided for each entry point is provided in an API call target address table 26, which is shown in FIG. 4. With reference to FIG. 4, the API call target address table 26 includes a plurality of entries 26(0) through 26(N−1) (generally identified by reference numeral 26(n)), where "N" represents the number of possible entry points for operating system calls and each value of "n" corresponds to one of the operating system call index values. Since there are 64 k possible entry points in one embodiment of the invention, there are 64 k entries in the table 26. When an emulated program is loaded by the host microprocessor 11, during a process generally referred to as "dynamic linking," "binding," "address resolution" or "fix-up" (which collectively will be referred to as "fix-up"), the host microprocessor 11 will provide, in the executable program code for the emulated program, for each operating system call the target address from the target address table 26 that is appropriate to the particular type of the operating system call. Thus, if a particular instruction of the emulated program is an operating system call of the type associated with a particular operating system call index value "x," during the fix-up process while the program is being loaded, the host microprocessor 11 will provide the target address from entry 26(x) of the API call target address table 26 for that instruction.

Each entry 26(n) in the API call target address table 26 comprises thirty-two bits. When an operating system call is made using the target address from an entry 26(n), the high-order sixteen bits will be used as the descriptor pointer for the segment register 30(m) for the code segment, and the low-order sixteen bits of the entry 26(n) used as the offset value for offset field 37 of the address register 35 (FIG. 2). As noted above, the host microprocessor 11 makes use of the value of the code segment's descriptor pointer in the code segment's segment register 30(m) in the identification of the appropriate entry point for the operating system call, and sixteen successive segment descriptors 31(d) in the segment descriptor table 31 are allocated for this purpose, associated with sixteen successive value for the descriptor pointer, starting from a segment descriptor 31 (BASIS) pointed to by a base value "BASIS" through the segment descriptor 31 (BASIS+15) which is pointed to by thevalue "BASIS+ (DESC_LEN*15)," where "DESC_LEN" is the length of each segment descriptor and "*" refers to the multiplication operation. All of the sixteen segment descriptors 31(d) that are so allocated have a segment base address in their respective fields 34(d) that point to the first entry 25(0) of the crossover table 25.

The target address in each entry 26(n) of the API call target address table 26 is constructed as follows. The high-order sixteen bits of each entry 26(n), is formed to have the value "BASIS+(8*(n div 4096))," for eight-byte segment descriptors 31(d), where "*" refers to the multiplication operation and "div" refers to the division operation, with the result of "a div b" being the integer portion of the quotient of "a" divided by "b." Thus, for (a) the first 4096 types of operating system calls, identified as a "first operating system call type set" and associated with "n" from zero to 4095, the high-order sixteen bits of the target address entries 26(0) through 26(4095) will contain the value "BASIS," since "n div 4096" equals zero for "n" between zero and 4095, inclusive, and thus the descriptor pointer provided thereby will point to the segment descriptor 31 (BASIS) pointed to by the value "BASIS;"

(b) the next 4096 types of operating system calls, identified as "second operating system call type set" and associated with "n" from 4096 through 8191, the high order sixteen bits of the target address entries 26(4096) through 26(8191) will contain the value "BASIS+8," since "n div 4096" equals one for "n" between 4096 and 8191, inclusive, and thus the descriptor pointer provided thereby will point to the segment descriptor 31(BASIS+1);

and so forth, and for (c) the last, sixteenth, set of 4096 types of operating system calls, identified as a "sixteenth operating system call type set" and associated with "n" from 64 k-4095 through 64 k-1, the high-order sixteen bits of the target address entries 26(64k-4095) through 26(64k-1) will contain the value "BASIS+(8*15)," since "n div 4096" equals fifteen for "n" between 64(k)-4095 and 64 k-1, inclusive, and thus the descriptor pointer provided thereby will point to the segment descriptor 31(BASIS+15).

The low-order sixteen bits of each target address entry 26(n) is formed to have the value "(n mod 4096)*0x10," where "*" refers to the multiplication operation, "mod" refers to the modulo operation, with the result of "a modulo b" being the remainder portion of the quotient "a" divided by "b," and "0x10" refers to the hexadecimal value "10" (which corresponds to the decimal value sixteen), for sixteen-byte crossover table entries 25(c). Thus, for each series of 4096 consecutive target address entries 26(0) . . . 26(4095), 26(4096) . . . 26(8191), . . . , 26(64k-4096) . . . 26(64k), (i) the low-order bits of the first entry 26(0), 26(4096), . . . , 26(64k-4096) in each set contains the value zero, since "n mod 4096" equals zero for n=0, 4096, . . . , 64 k-4096, (ii) the low-order bits of the second entry 26(1), 26(4097), . . . , 26(64k-4095) in each set contains the hexadecimal value "10," since "n mod 4096" equals one for n=1, 4097, . . . , 64 k-4095, (iii) the low-order bits of the third entry 26(2), 26(4098), . . . 26(64k-4094) in each set contains the hexadecimal value "20," since "n mod 4096" equals two for n=2, 4098, . . . , 64 k-4094, and so forth, with (iv) the low-order bits of the last entry 26(4095), 26(8191), . . . , 26(64k) in each set containing the hexadecimal value "FFF0," since "n mod 4096" equals 4095 (which corresponds to "FFF" in the hexadecimal representation) for n=4095, 8191, . . . , 64 k.

As noted above, each of the sixteen successive segment descriptors 31 in the segment descriptor table 31 that are allocated for use in connection with operating system calls contains a segment base address in their respective fields 34(d) that points to the first entry 25(0) in the crossover table 25. As further noted above, since the operating system call in a microprocessor of the x86 family is a far call, during emulation by host microprocessor 11 the high-order sixteen bits of the target address of the call, which corresponds to the high-order sixteen bits of the target address entry 26(n) for the associated type of operating system call, are loaded into the code segment's segment register 30(m) as the new descriptor pointer. This descriptor pointer points to one of the segment descriptors 31(BASIS), . . . , 31(BASIS+15), all of which have a segment base address in their respective fields 34(d) that points to the first entry 25(0) in the crossover table 25. In addition, during emulation of the operating system call the host microprocessor 11 loads the low-order sixteen bits of the target address of the call, which corresponds to the low-order sixteen bits of the target address entry for the associated operating system call type, into the offset field 37 of the address register 35. Thus, the sum of the segment base address provided by the segment descriptor 31(d) in the segment descriptor table 31 (reference FIG. 2) that is pointed to by the descriptor pointer in the in the segment register 30(m) associated with the code segment, and the offset in field 37 of the address register 35, is one of the entries 25(c) in the crossover table 25, in particular the entry 25(c) determined by c="n mod 4096," where "n" corresponds to the index for the operating system call type.

Figure 5:
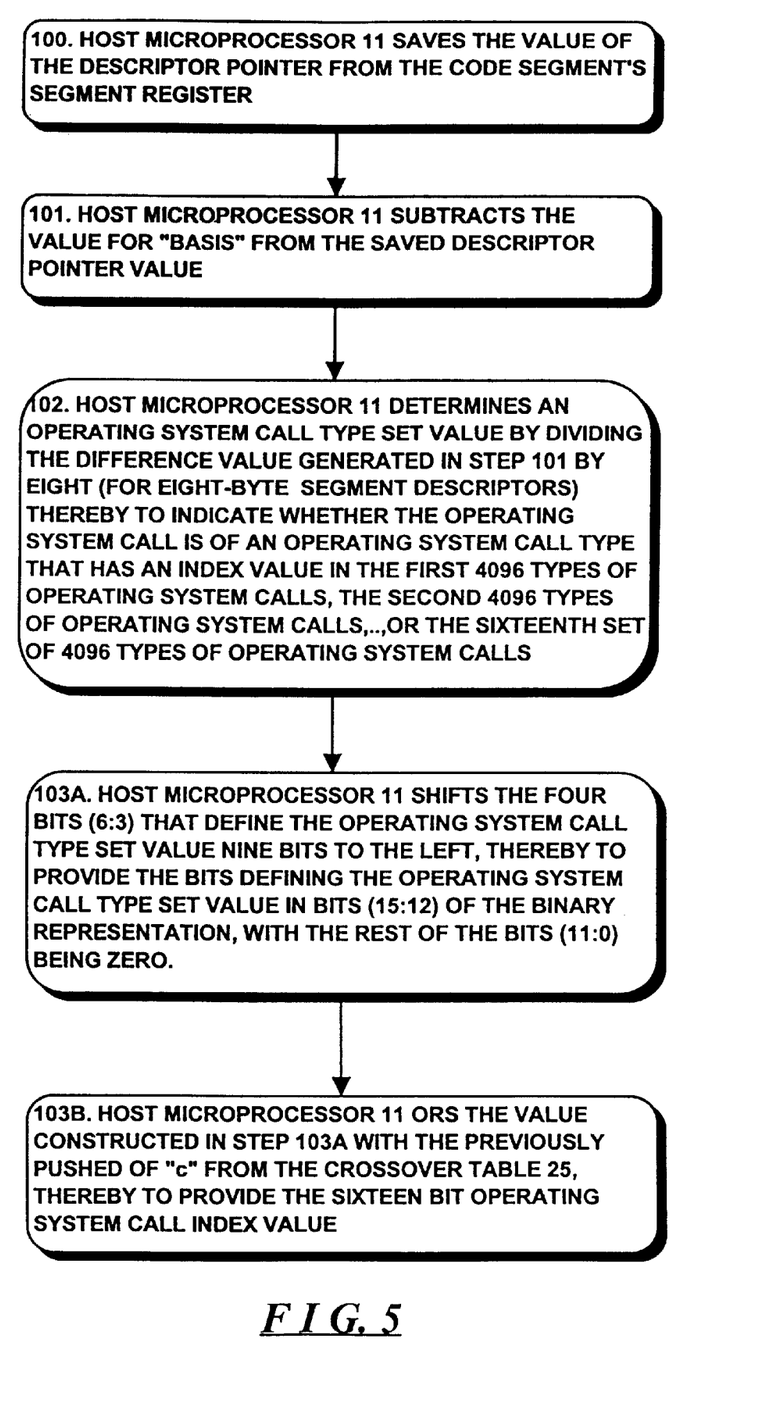
FIG. 5 is a flowchart depicting operations performed by the host microprocessor in connection with the operating system call structure emulation arrangement.

The result of the operating system call is to enable the host microprocessor 11 to begin processing the instructions in the entry 25(c), in particular to push the value "c" on the stack during execution of the "push (c)" instruction and to jump to the APIDispatch routine during execution of the "jmp APIDispatch" instruction. As noted above, the APIDispatch routine enables the host microprocessor 11 to, among other things, generate the sixteen-bit operating system call type index value "n," using the value "c" pushed on the stack as a result of the push (c) instruction and the value of the descriptor pointer in the segment register 30(m) associated with the code segment. Operations performed by the host microprocessor 11 under control of the APIDispatch routine are depicted in the flowchart in FIG. 5. With reference to FIG. 5, the host microprocessor 11, under control of the APIDispatch routine, will save the value of the descriptor pointer from the code segment's segment register 30(m) (step 100), and subtract the value for "BASIS" (step 101), which, as noted above, points to the first segment descriptor 31(d) in the series of sixteen segment descriptors in the segment descriptor table 31 that is allocated for operating system calls. The host microprocessor 11 then determines an operating system call type set value by dividing the difference value by eight (for eight-byte segment descriptors) (step 102), thereby to indicate whether the operating system call is of an operating system call type that has an index in the first 4096 types of operating system calls (associated with "n" from zero to 4095), the second 4096 types of operating system calls (associated with "n" from 4096 through 8191), . . . , or the sixteenth set of 4096 types of operating system calls (associated with "n" from 64 k-4095 through 64 k-1). The host microprocessor 11 then (step 103) concatenates the binary encoded value of the operating system call type set and the binary representation of the value "c" pushed onto the stack in response to the "push (c)" instruction <OS_CALL_TYPE_SET|c>, where "|" refers to the concatenation operation, thereby to construct the operating system call index value for the operating system call from the emulated program. It will be appreciated that the host microprocessor 11 can perform:

(i) the division operation (step 102), by clearing the low-order three bits (2:0) of the binary representation of the difference value; in that case it will be appreciated that the operating system call type set value will be defined by the four bits (6:3) of the binary representation; and (ii) the concatenation operation (step 103) by:
   (a) shifting the four bits (6:3) that defined the operating system call type set value nine bits to the left (that is, to higher-order bit positions) (step 103a), thereby to provide the bits defining the operating system call type set value in bits (15:12) of the binary representation, with the rest of the bits (11:0) being zero, and
   (b) ORing the value constructed in (ii)(a) above with the value of "c" (step 103b)

It will be appreciated that the value generated in (ii)(a) above corresponds to the sixteen-bit operating system call type index "n" for the operating system call. After the host microprocessor 11 has performed operations, the APIDispatch routine can enable the host microprocessor 11 to perform the other operations necessary to facilitate a call to the microprocessor's operating system to service the routine, such as switching stacks from the sixteen bit stack used during emulation of the emulated program to a thirty-two bit stack normally used by the microprocessor, and use the constructed operating system call index value to identify the host operating system routine to provide the service required by the operating system call.

The invention provides a number of advantages. In particular, the invention provides an efficient arrangement for facilitating the emulation by the host microprocessor 11 and host operating system operating system calls which may be issued by emulated programs written for execution by a microprocessor of, for example, the x86 microprocessor family under control of the Microsoft Windows™ operating system. In particular, the invention provides an arrangement whereby a crossover table 25 may be used which requires far fewer entries than the number of possible operating system call index values used in operating system calls in the Microsoft Windows™ operating system.

It will be appreciated that numerous modifications may be made to the arrangement described above in connection with FIGS. 1 through 5. For example, although the arrangement has been described as using a crossover table 25 of 4096 entries 25(0) through 25(4095), each of which is associated with one of sixteen operating system call sets, with each operating system call set being associated with a segment descriptor 31(d), it will be appreciated that a crossover table may be used with more or fewer entries, with correspondingly decreased or increased numbers of segment descriptors. Thus, the arrangement may include a crossover table 25 of 2048 entries, each of which is associated with one of thirty-two operating system call sets, with each operating system call set being associated with one of thirty-two segment descriptors 31(d). On the other hand, the arrangement may use a crossover table of 8192 entries, each of which is associated with one of eight operating system call sets, with each operating system call set being associated with one of eight segment descriptors 31(d).

In addition, although the arrangement has been described as making use of an API call target address table 26 as providing target addresses for use in connection with fix-up operations, it will be appreciated that the host microprocessor may instead generate the target addresses directly, with the high-order sixteen bits having the value "BASIS+(DESC_LEN*n div 4096)" and the low-order sixteen bits having the value "n mode 4096*CT_ENTRY_LEN" (where "CT_ENTRY_LEN" represents the number of bytes in each entry in the crossover table.)

Furthermore, although the arrangement has been described as making use of eight-byte segment descriptors 31(d) and sixteen-byte crossover table entries 35(c), it will be appreciated that different length segment descriptors crossover table entries may be used.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An operating system call control subsystem for use in a computer including a processor for processing a program, the program having at least one instruction of an operating system call instruction type, said instruction of the operating system call instruction type identifying one of a plurality of types of operating system calls, each type of operating system call being associable with an operating system call type identifier value within a predetermined range of values, the operating system call control subsystem comprising:

A. a crossover table configured to have a number of entries corresponding to a predetermined fraction of the predetermined range, each entry in said crossover table having an instruction for enabling the processor to save a value corresponding to an offset of the entry into the crossover table, B. an operating system call instruction type address resolution module for providing the at least one instruction of the operating system call instruction type with a target address value that includes an operating system call set identifier in a set of operating system call set identifiers, the number of operating system call set identifiers multiplied by the number of crossover table entries corresponding to the predetermined range and an offset value corresponding to an offset to an entry into the crossover table, and C. an operating system call instruction type processing module configured to, in response to the processor processing the at least one instruction of the operating system call instruction type, (a) save the operating system call set identifier from the target address, (b) select one of the entries in the crossover table using the offset value of the target address, (c) process the instruction from the selected entry of the crossover table to save the value corresponding to the offset of the selected entry in the crossover table, and (d) generate the operating system call type identifier value associable with the operating system call in connection with the saved operating system call set identifier and the saved value corresponding to the offset of the selected entry in the crossover table.

2. An operating system call control subsystem as defined in claim 1 in which said program is provided with a segmented address space comprising a plurality of segments, each segment being defined by one of a series of segment descriptors, with a segment descriptor for a current descriptor being pointed to by a segment descriptor pointer, the operating system call set identifiers in the set of operating system call set identifiers pointing to successive ones of said segment descriptors, the processor, while processing the at least one instruction of the operating system call instruction type, providing the operating system call set identifier as the segment descriptor pointer.

3. An operating system call control subsystem as defined in claim 2 in which each segment descriptor points to a base of a segment, one of said segments containing the crossover table, and all of the segment descriptors pointed to by the operating system call set identifiers point to the segment containing the crossover table.

4. An operating system call control subsystem as defined in claim 3 in which the operating system call instruction type processing module is configured to select one of the entries of the crossover table in relation to the segment pointed to by the segment descriptor pointed to by the operating system call set identifier and the offset value from the target address.

5. An operating system call control subsystem as defined in claim 2 in which said segment descriptors form segment descriptor entries in a segment descriptor table, the segment descriptor pointer pointing to the one of the entries containing the segment descriptor for the current segment, the operating system call set identifiers in the set pointing to successive entries in the segment descriptor table from a base entry associated with a segment descriptor table offset value, the target address providing a segment descriptor pointer, the operating system call instruction type processing module being configured to generate the operating system call set identifier in relation to the segment descriptor pointer and the segment descriptor table offset value.

6. An operating system call control subsystem as defined in claim 1 in which the operating system call instruction type processing module is configured to generate the operating system call type identifier value with the saved operating system call set identifier as a high-order portion and the saved value corresponding to the offset of the selected entry in the crossover table as a low-order portion.

7. A computer program product for use in connection with a computer to provide an operating system call control subsystem for use with a processor, the processor being configured to process a program having at least one instruction of an operating system call instruction type, said instruction of the operating system call instruction type identifying one of a plurality of types of operating system calls, each type of operating system call being associable with an operating system call type identifier value within a predetermined range of values, computer program product comprising a computer-readable medium having encoded thereon:

A. a crossover table configured to have a number of entries corresponding to a predetermined fraction of the predetermined range, each entry in said crossover table having an instruction for enabling the processor to save a value corresponding to an offset of the entry into the crossover table, B. an operating system call instruction type address resolution module for enabling the computer to provide the at least one instruction of the operating system call instruction type with a target address value that includes an operating system call set identifier in a set of operating system call set identifiers, the number of operating system call set identifiers multiplied by the number of crossover table entries corresponding to the predetermined range and an offset value corresponding to an offset to an entry into the crossover table, and C. an operating system call instruction type processing module configured to enable the computer to, in response to the processor processing the at least one instruction of the operating system call instruction type, (a) save the operating system call set identifier from the target address, (b) select one of the entries in the crossover table using the offset value of the target address, (c) process the instruction from the selected entry of the crossover table to save the value corresponding to the offset of the selected entry in the crossover table, and (d) generate the operating system call type identifier value associable with the operating system call in connection with the saved operating system call set identifier and the saved value corresponding to the offset of the selected entry in the crossover table.

8. A computer program product as defined in claim 7 in which said program is provided with a segmented address space comprising a plurality of segments, each segment being defined by one of a series of segment descriptors, with a segment descriptor for a current descriptor being pointed to by a segment descriptor pointer, the operating system call set identifiers in the set of operating system call set identifiers pointing to successive ones of said segment descriptors, the processor, while processing the at least one instruction of the operating system call instruction type, providing the operating system call set identifier as the segment descriptor pointer.

9. A computer program product as defined in claim 8 in which each segment descriptor points to a base of a segment, one of said segments containing the crossover table, and all of the segment descriptors pointed to by the operating system call set identifiers point to the segment containing the crossover table.

10. A computer program product as defined in claim 9 in which the operating system call instruction type processing module is configured to enable the computer to select one of the entries of the crossover table in relation to the segment pointed to by the segment descriptor pointed to by the operating system call set identifier and the offset value from the target address.

11. A computer program product as defined in claim 8 in which said segment descriptors form segment descriptor entries in a segment descriptor table, the segment descriptor pointer pointing to the one of the entries containing the segment descriptor for the current segment, the operating system call set identifiers in the set pointing to successive entries in the segment descriptor table from a base entry associated with a segment descriptor table offset value, the target address providing a segment descriptor pointer, the operating system call instruction type processing module being configured to enable the computer to generate the operating system call set identifier in relation to the segment descriptor pointer and the segment descriptor table offset value.

12. A computer program product as defined in claim 7 in which the operating system call instruction type processing module is configured to enable the computer to generate the operating system call type identifier value with the saved operating system call set identifier as a high-order portion and the saved value corresponding to the offset of the selected entry in the crossover table as a low-order portion.

13. An operating system call control method for use in connection with a computer including a processor for processing a program, the program having at least one instruction of an operating system call instruction type, said instruction of the operating system call instruction type identifying one of a plurality of types of operating system calls, each type of operating system call being associable with an operating system call type identifier value within a predetermined range of values, the operating system call control method comprising the steps of:

A. providing a crossover table configured to have a number of entries corresponding to a predetermined fraction of the predetermined range, each entry in said crossover table having an instruction for enabling the processor to save a value corresponding to an offset of the entry into the crossover table, B. an operating system call instruction type address resolution step including the step of providing the at least one instruction of the operating system call instruction type with a target address value that includes an operating system call set identifier in a set of operating system call set identifiers, the number of operating system call set identifiers multiplied by the number of crossover table entries corresponding to the predetermined range and an offset value corresponding to an offset to an entry into the crossover table, and C. an operating system call instruction type processing step including the steps of, in response to the processor processing the at least one instruction of the operating system call instruction type, (a) saving the operating system call set identifier from the target address, (b) selecting one of the entries in the crossover table using the offset value of the target address, (c) processing the instruction from the selected entry of the crossover table to save the value corresponding to the offset of the selected entry in the crossover table, and (d) generating the operating system call type identifier value associable with the operating system call in connection with the saved operating system call set identifier and the saved value corresponding to the offset of the selected entry in the crossover table.

14. An operating system call control method as defined in claim 13 in which said program is provided with a segmented address space comprising a plurality of segments, each segment being defined by one of a series of segment descriptors, with a segment descriptor for a current descriptor being pointed to by a segment descriptor pointer, the operating system call set identifiers in the set of operating system call set identifiers pointing to successive ones of said segment descriptors, the processor, while processing the at least one instruction of the operating system call instruction type, providing the operating system call set identifier as the segment descriptor pointer.

15. An operating system call control method as defined in claim 14 in which each segment descriptor points to a base of a segment, one of said segments containing the crossover table, and all of the segment descriptors pointed to by the operating system call set identifiers point to the segment containing the crossover table.

16. An operating system call control method as defined in claim 15 in which the operating system call instruction type processing step includes the step of selecting one of the entries of the crossover table in relation to the segment pointed to by the segment descriptor pointed to by the operating system call set identifier and the offset value from the target address.

17. An operating system call control method as defined in claim 14 in which said segment descriptors form segment descriptor entries in a segment descriptor table, the segment descriptor pointer pointing to the one of the entries containing the segment descriptor for the current segment, the operating system call set identifiers in the set pointing to successive entries in the segment descriptor table from a base entry associated with a segment descriptor table offset value, the target address providing a segment descriptor pointer, the operating system call instruction type processing step including the step of generating the operating system call set identifier in relation to the segment descriptor pointer and the segment descriptor table offset value.

18. An operating system call control method as defined in claim 13 in which the operating system call instruction type processing step includes the step of generating the operating system call type identifier value with the saved operating system call set identifier as a high-order portion and the saved value corresponding to the offset of the selected entry in the crossover table as a low-order portion.

* * * * *